Patented Apr. 3, 1951

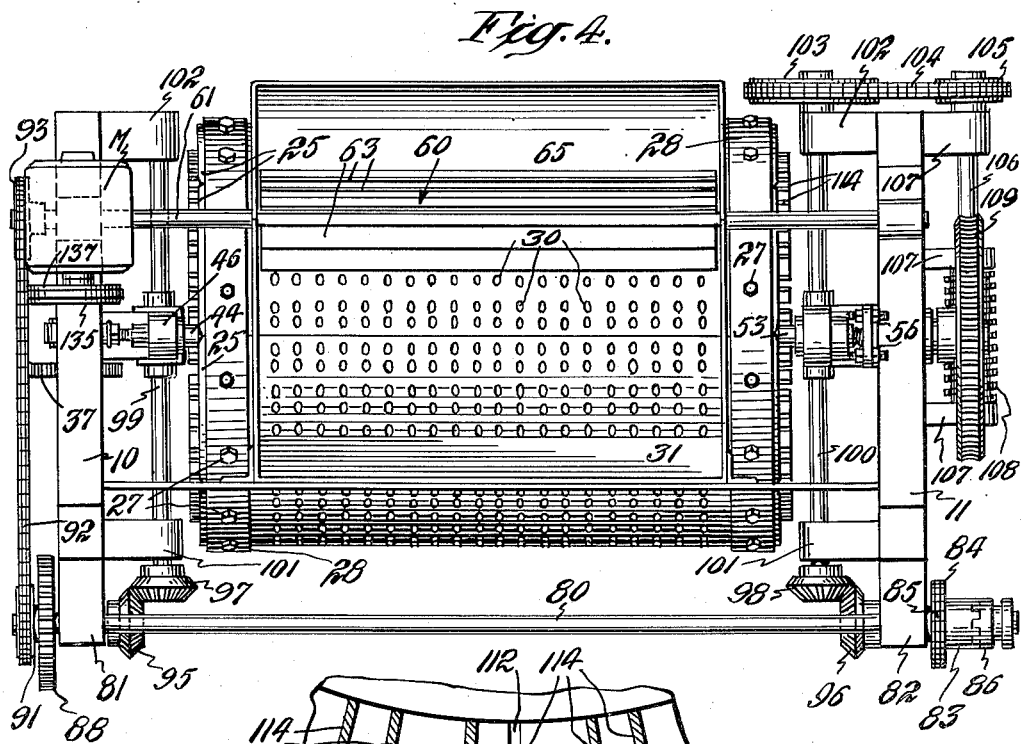

2,547,516

UNITED STATES PATENT OFFICE 2,547,516

MACHINE FOR DEPOSITING NUTS ON CANDY BARS

Louis H. Zeun, Naugatuck, Conn., assignor to Peter Paul, Inc., Naugatuck, Conn., a corporation of Delaware Application August 13, 1948, Serial No. 44,094

12 Claims. (Cl. 107—7)

1

This invention relates to a machine for depositing and positioning nuts on candy bars.

At the present time a candy bar is being marketed with nuts on the top of the bar. The nuts are placed on the bar by hand, thus involving a considerable labor cost.

This invention has for its salient object to provide a simple and practical machine for efficiently and accurately positioning nuts on candy bars.

Another object of the invention is to provide efficient means of the character described for accurately and securely positioning nuts on candy bars during the movement of the bars through the machine.

Further objects of the invention will appear from the following specification taken in connection with the drawings which form a part of this application, and in which Fig. 1 is an end elevation of one end of a machine embodying the invention;

Fig. 4 is a top plan view of the machine, parts being removed for the sake of clearness in illustration;

Fig. 5 is an enlarged sectional elevation of a portion of the drum showing the ejector mechanism;

Fig. 6 is a plan view, partly in section, of one of the cam controlled levers for actuating the ejector bars; and Fig. 7 is a plan view of one of the nut carrying plates.

Figure 1:
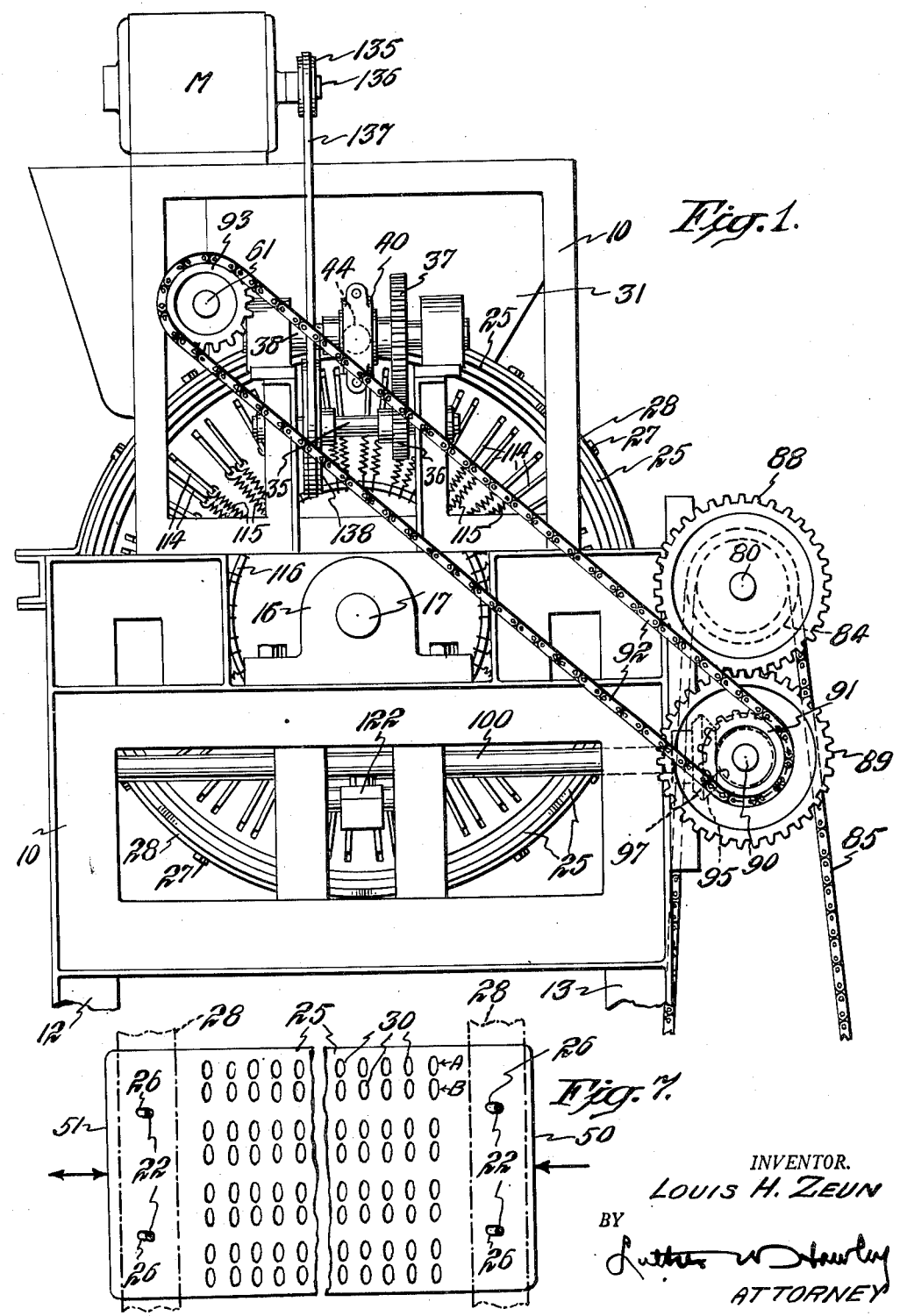

The invention briefly described consists of a machine comprising a carrier, plates mounted on the carrier and having pockets for receiving the articles, such as nuts, to be delivered, means for causing the nuts to enter the pockets, means for holding the nuts in the pockets until they reach a position over the articles, such as candy bars, on which they are to be deposited, and means for ejecting the nuts from the pockets and pushing them into the tops of the candy bars.

Further details of the invention will appear from the following description.

In the particular embodiment of the invention illustrated in the drawings, the machine is supported on a frame comprising two rectangular end frames 10 and 11 mounted on suitable supports or legs 12 and 13. The end frames 10 and 11 have mounted thereon bearing blocks 15 and 16, in which is mounted a shaft 17 to which are

2 secured disks 18 and 19 which form the end plates of a drum. The shell or cylinder 20 of the drum is secured to flanges 21 by means of screws or bolts 22.

The shell or cylinder 20 of the drum has mounted thereon a plurality of arcuate plates 25, these plates having slots 26 which receive the bolts 22. The plates are, therefore, slidably mounted on the periphery of the drum. The heads 27 of the bolts 22 engage bands 28 which hold the plates in position on the drum.

Each of the plates 25 has formed therein a plurality of openings or holes 30 which are adapted to receive nuts from a hopper 31 which is mounted above the drum and is open at the bottom, as shown at 32, so that the nuts can rest on the plates as the plates pass beneath the hopper. The hopper 31 is mounted on the end frame 10.

Figure 3:
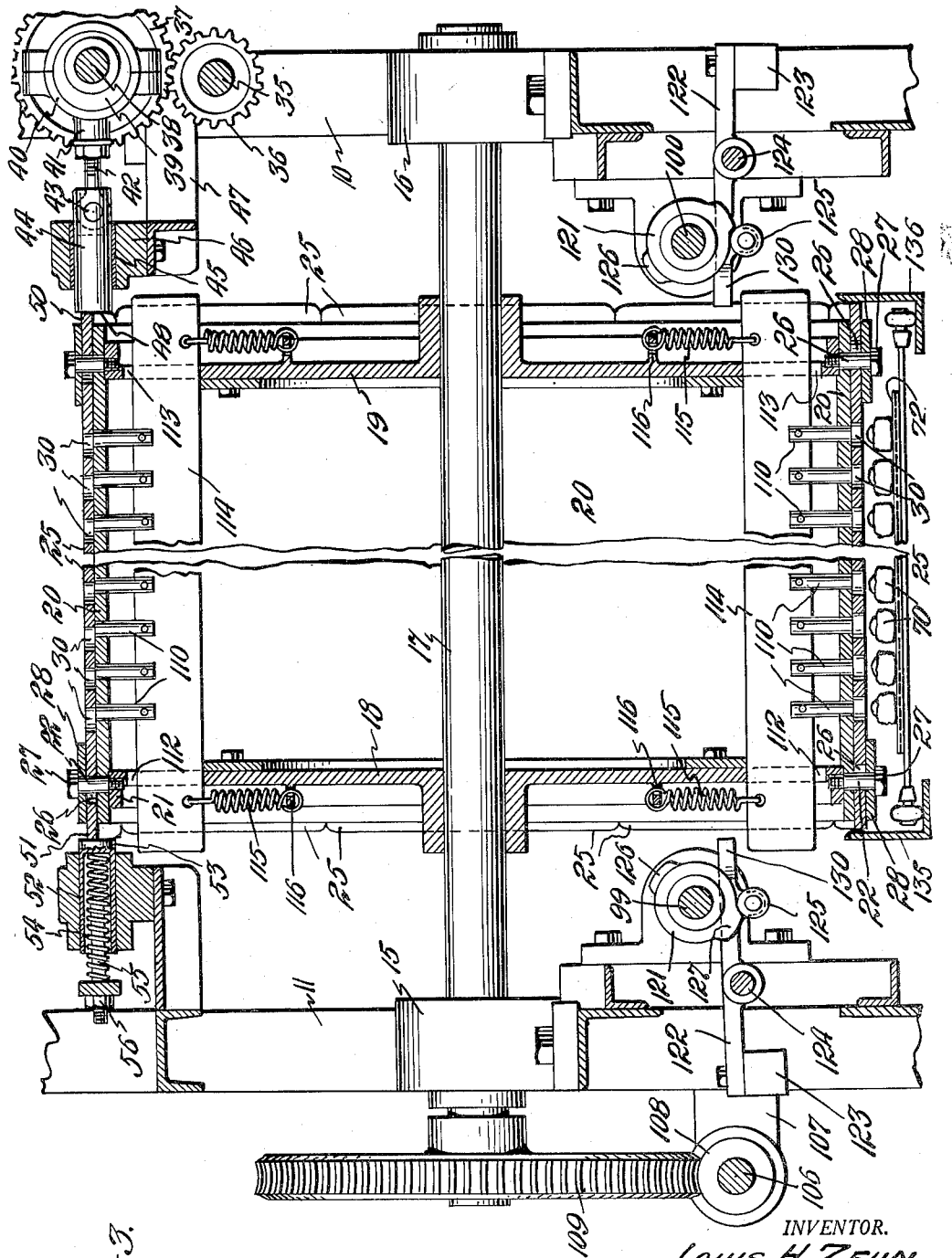
Fig. 3 is a vertical sectional elevation of the drum and parts carried thereby.

In order to insure the entry of the nuts into the pockets formed by the openings or holes 30 in the plates, the plates are reciprocated back and forth in a direction parallel to the axis of the drum in the manner illustrated particularly in Fig. 3. In this figure there is shown a shaft 35 which is rotated in a manner hereinafter described and has mounted thereon a gear 36 which meshes with a gear 37 mounted on a shaft 38. Shafts 35 and 38 are supported in bearings carried by the end frame 10. Shaft 38 has secured thereto an eccentric disk 39, on which is mounted a ring 40, which has secured to the periphery thereof a boss 41, in which is mounted a rod 42 which is pivoted at 43 to a plunger 44 slidably mounted in a bearing 45 carried by a block 46 which is mounted in a bracket 47 carried by the frame 10. The inner end 48 of the plunger 44 engages one end 50 of each of the plates as the plate reaches a position beneath the hopper. At the other end 51 of the plate there is positioned a slidable tube or sleeve 52 having a closed end 53 which engages the end 51 of the plate. This sleeve is held in engagement with the plate by means of a spring 54 disposed in the sleeve and mounted on a stud 55, which in turn is carried by the end frame 11. The compression of the spring can be adjusted by means of a nut 56 on the stud 55.

In the foregoing manner, as each of the plates reaches a position beneath the discharge opening 32 of the hopper, the plate is reciprocated rapidly, thus causing the nuts which are disposed on the outer surface of the plate to enter the openings 30 which form the pockets.

In order to further insure the positioning of the nuts in the openings, there is mounted in the hopper, an agitator 60, which is rotated by a shaft 61 driven in a manner hereinafter described. The agitator 60 has mounted thereon, tangentially thereof, a plurality of wiper blades 63, which are preferably formed of flexible material, such as rubber. The agitator is rotated in the direction of the arrow shown in Fig. 2 and as it is rotated the blades 63 cause the nuts which have not entered the holes or openings 30 in the plate to be pushed into the openings and also move the nuts away from the inturned flange 65 which is formed on one lower edge of the bottom.

Figure 2:
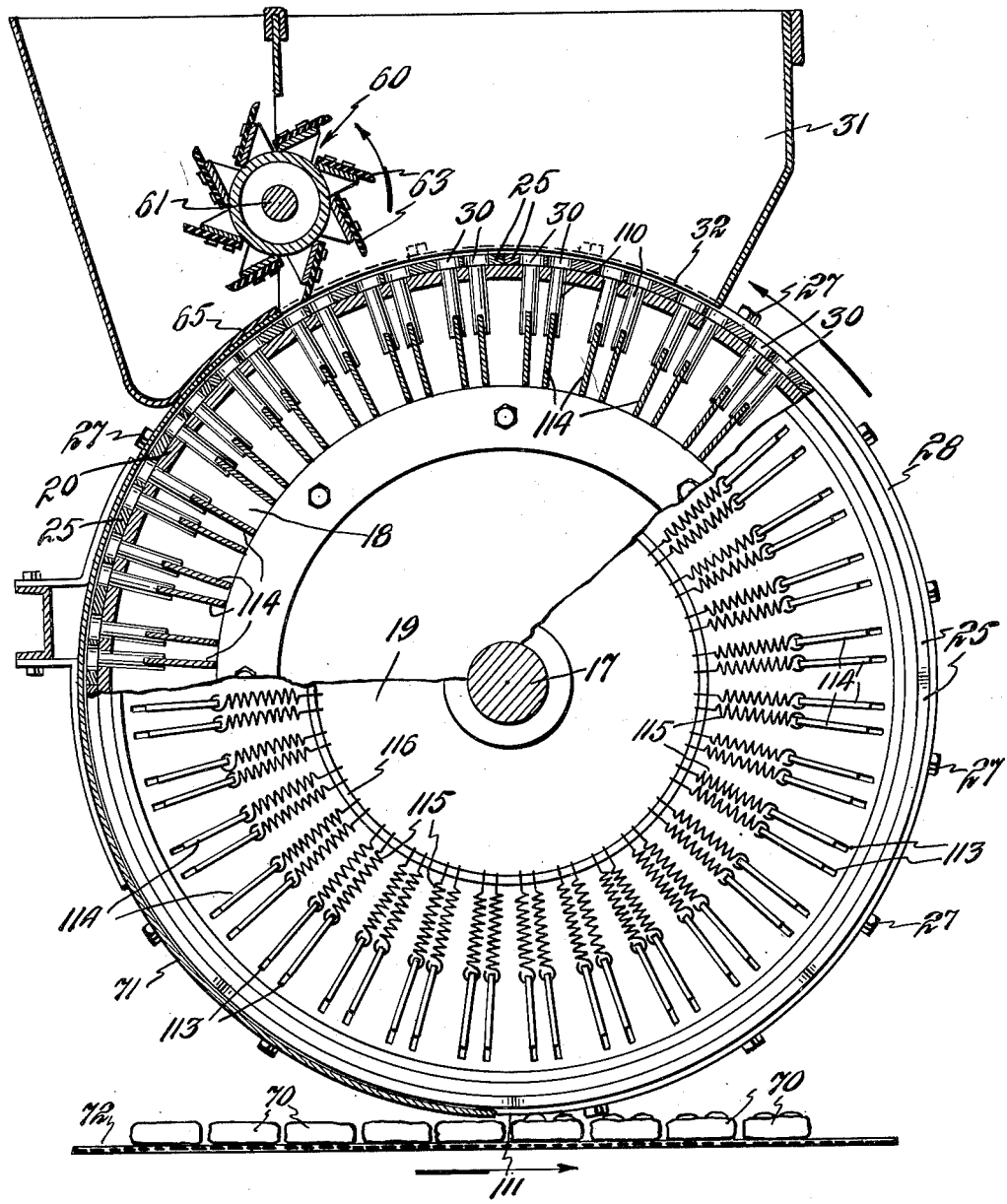
Fig. 2 is a view partly in end elevation and partly in section of the hopper, drum, and travelling belt.

In order to retain the nuts in the openings 30 as the drum and plates carried thereby rotate from beneath the hopper in a direction of the arrows shown in Fig. 2 to a position above the path of travel of the candy bar 70, an arcuate plate or shield 71 is mounted on the frame of the machine around the outer surface of the plates 25.

The candy bars 70 are supported on a carrier 72 which travels beneath the drum, suitable driving connections being provided to synchronize the movement of the carrier and drum.

In the form of the invention shown, the drum is driven in the following manner. A shaft 80 is rotatably mounted in bearing blocks 81 and 82 carried by the frame members 10 and 11. This shaft has rotatably mounted thereon a clutch member 83 having a sprocket 84 which is driven by a chain 85, the chain being driven from any suitable source of power. A clutch member 86 is slidably mounted on the shaft 80 and is splined thereto so that when the clutch member 86 is moved into engagement with the clutch member 83 the drive from the sprocket 84 will be communicated to the shaft 80.

On the other end of the shaft 80 there is mounted a gear 88 which meshes with a gear 89 carried by a shaft 90 also mounted in bearing supports carried by the frame supports 10 and 11. Shaft 90 has also mounted thereon a sprocket 91 which is connected by a chain 92 to drive a sprocket 93 mounted on the shaft 61, thus driving the agitator 60.

Shaft 90 has also mounted thereon, bevel gears 95 and 96 which mesh with gears 97 and 98 carried by shafts 99 and 100 which are mounted in bearing brackets 101 and 102 carried by the frames 10 and 11. The shaft 100 has mounted on the outer end thereof a sprocket 103, which is connected by a chain 104 to drive a sprocket 105 on a shaft 106 which is mounted in bearing brackets 107 carried by the frame 11. Shaft 106 has mounted thereon a worm 108 which meshes with a worm gear 109 secured to one end of the shaft 17 of the drum. The eccentric oscillating mechanism for reciprocating the plates is driven by a separate motor M, which is mounted on the top of the end frame 10 and has a sheave 135 secured to the motor shaft 136. The sheave 135 is connected by a belt 137 to drive a sheave 138 mounted on the shaft 35. This shaft, through the gears 36 and 37, drives the shaft 38, as above described.

The candy bars 70 are properly spaced on the carrier 72 and the carrier 72 and the drum are synchronized in their movement so that a candy bar will come into registration with the nut carrying pockets 30 in the plates 25 in the manner particularly illustrated in Figs. 2 and 5. The pockets or openings 30 in the plates 25 are spaced in pairs, as shown for instance at A and B in Fig. 7, and the candy bars 70 are so dimensioned that two nuts will be deposited on the top of each candy bar, as shown in Figs. 2 and 5.

In order to insure the discharge of the nuts, such as almonds, from the openings 30 in the plates 25 and to push the nuts into the tops of the candy bars, plungers 110 are mounted in the cylinder or shell 20 of the drum and means is provided for pushing these plungers radially outwardly when the openings carrying the nuts are moved to a position beyond the end 111 of the arcuate shield 71.

The end plates or disks 18 and 19 of the drum have formed therein radial slots 112 and 113, these slots being alined with the pairs A, B of the openings 30 in the plates 25. In the slots 112 and 113 in the end plates 18 and 19 are slidably mounted bars 114 and the outer end of each bar is engaged by a spring 115, the other end of the spring being connected to an annular flange 116 formed on and projecting outwardly from the outer surface of the end plates 18, 19. Each of the bars 114 has secured thereto a plurality of plungers 110, one plunger being located opposite each of the openings 30, so that when the bars 114 are actuated in the manner hereinafter described the nuts in all of the openings in a single row across the plate will be ejected.

In order to actuate the bars 114 when each bar reaches the position X shown on Fig. 5, the shafts 99 and 100, as shown particularly in Fig. 3, have mounted thereon cams, each shaft being provided with a pair of cams 120 and 121, as shown in Fig. 6. The cam actuated lever 122 is pivoted to the frame and has a weight 123 at its outer end adapted to lower the outer end of the lever and raise the inner end. Each lever 122 is pivoted at 124 and has mounted thereon and projecting laterally therefrom at each side of the lever, a roller 125.

The cams are provided with projecting portions or lands 126 and 127. The inner ends 130 of the levers 122 are disposed above the path of movement of the upper ends or edges 131 of the bars 114 and the cams are so designed that when each bar reaches the position X shown in Fig. 5, one of the cams 120 or 121 at each side of the machine will depress the lever 122 and cause the inner end 130 of the lever 122 and cause the inner end 130 of the lever to depress the bar 114 disposed in the position X and push the nuts out of the openings 30 and press them into the top of the candy bar, as shown in Fig. 5. Since two nuts are pressed into each candy bar, the two bars controlling the plungers of the pair corresponding to the rows of openings A and B will be depressed in quick succession by the operation of the two cams 120 and 121 on the shafts 99 and 100. After the bars have been actuated they are retracted by the springs 115 and remain inactive until they again reach the position X.

Operation

The operation of the machine may be briefly summarized as follows. Assuming that the candy bars have been properly deposited on the carrier 72 to conform in spacing to the spacing of the openings 30, as shown at A and B, and that a supply of nuts has been deposited in the hopper 31, the machine is started and the plates will be reciprocated by the eccentric to position the nuts in the pockets or openings 30, this operation being facilitated by the flexible paddles or blades 63 of the agitator 60. The blades prevent excess nuts from jamming the end of the hopper and also prevent two nuts from being carried in one pocket or opening. As the drum is rotated in the direction of the arrow shown in Fig. 2, the plates will pass beneath the shield 71 and the nuts will be held in the pockets until the pockets pass from beneath the lower end 111 of the shield 71. The plates 50 will be accurately centered, when disposed above the carrier 72 by flanges 135 and 136 which extend upwardly from the carrier supporting rails, as shown in Fig. 3. Thus, the openings 30 will be lined up with the plungers 110. Thereupon the bars 114 and ejectors 110 carried thereby will push the nuts from the pockets and press them into the tops of the candy bars, these parts being operated in the manner hereinbefore described to carry out this ejecting operation as these bars and the plungers carried thereby reach the position indicated at X in Fig. 5.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In a machine of the character described, means for feeding a plurality of candy bars, a nut hopper having an opening in the bottom for the passage of the nuts, a rotatable drum below the hopper and above the path of travel of the candy bars, means reciprocatably mounted on said drum having a plurality of pockets for receiving the nuts from the hopper, said drum and reciprocatable means being movable beneath the hopper opening, means for reciprocating said pocket carrying means to position a nut in each pocket, and means for holding the nuts in the pockets as the drum is rotated from receiving to discharging position above the candy bars.

2. In a machine of the character described, means for feeding a plurality of candy bars, a nut hopper having an opening in the bottom for the passage of the nuts, a rotatable drum below the hopper and above the path of travel of the candy bars, means reciprocatably mounted on said drum having a plurality of pockets for receiving the nuts from the hopper, said drum and reciprocatable means being movable beneath the hopper opening, means for reciprocating said pocket carrying means to position a nut in each pocket, means for holding the nuts in the pockets as the drum is rotated from receiving to discharging position above the candy bars, and means for ejecting the nuts from the pockets when the drum and pocket carrying means reach discharging position above the candy bars.

3. In a machine of the character described, means for feeding a plurality of candy bars, a nut hopper having an opening in the bottom for the passage of the nuts, a rotatable drum below the hopper and above the path of travel of the candy bars, a plurality of plates reciprocatably mounted on said drum having a plurality of pockets for receiving the nuts from the hopper, said drum and reciprocatable plates being movable beneath the hopper opening means for reciprocating said plates to position a nut in each pocket, means for holding the nuts in the pockets as the drum is rotated from receiving to discharging position above the candy bars, and means for ejecting the nuts from the pockets when the drum and pocket carrying means reach discharging position above the candy bars.

4. In a machine of the character described, means for feeding a plurality of candy bars, a nut hopper having an opening in the bottom for the passage of the nuts, a rotatable drum below the hopper and above the path of travel of the candy bars, a plurality of arcuate plates mounted on the periphery of said drum and slidably supported thereon, said plates having pockets therein for receiving nuts from the hopper, said drum and plates carried thereby being movable beneath the hopper opening, means engageable with the plates as they move beneath the hopper for reciprocating the plates to cause the nuts to enter the pockets, and means extending around a portion of the drum periphery to hold the nuts in the pockets until the nuts reach a position above the candy bars.

5. In a machine of the character described, means for feeding a plurality of candy bars, a nut hopper having an opening in the bottom for the passage of the nuts, a rotatable drum below the hopper and above the path of travel of the candy bars, a plurality of arcuate plates mounted on the periphery of said drum and slidably supported thereon, said plates having pockets therein for receiving nuts from the hopper, said drum and plates carried thereby being movable beneath the hopper opening, means engageable with the plates as they move beneath the hopper for reciprocating the plates to cause the nuts to enter the pockets, means to hold the nuts in the pockets until the nuts reach a position above the candy bars, and means for ejecting the nuts from the pockets and pushing the nuts into the candy bars.

6. In a machine of the character described, means for feeding a plurality of candy bars, a nut hopper having an opening in the bottom for the passage of the nuts, a rotatable drum below the hopper and above the path of travel of the candy bars, a plurality of arcuate plates mounted on the periphery of said drum and slidably supported thereon, said plates having pockets therein for receiving nuts from the hopper, said drum and plates carried thereby being movable beneath the hopper opening, means engageable with the plates as they move beneath the hopper for reciprocating the plates to cause the nuts to enter the pockets, means to hold the nuts in the pockets until the nuts reach a position above the candy bars, and means carried by the drum for ejecting the nuts from the pockets and pushing the nuts into the candy bars.

7. In a machine of the character described, means for feeding a plurality of candy bars, a nut hopper having an opening in the bottom for the passage of the nuts, a rotatable drum below the hopper and above the path of travel of the candy bars, a plurality of arcuate plates mounted on the periphery of said drum and slidably supported thereon, said plates having pockets therein for receiving nuts from the hopper, said drum and plates carried thereby being movable beneath the hopper opening, means engageable with the plates as they move beneath the hopper for reciprocating the plates to cause the nuts to enter the pockets, means to hold the nuts in the pockets until the nuts reach a position above the candy bars, and means carried by the drum for ejecting the nuts from the pockets and pushing the nuts into the candy bars and movable radially of the drum axis.

8. In a machine of the character described, means for feeding a plurality of candy bars, a nut hopper having an opening in the bottom for the passage of the nuts, a rotatable drum below the hopper and above the path of travel of the candy bars, a plurality of plates reciprocatably mounted on said drum having a plurality of openings for receiving the nuts from the hopper, said drum and reciprocatable plates being movable beneath the hopper opening means for reciprocating said plates to position a nut in each opening, and means for holding the nuts in the openings as the drum is rotated from receiving to discharging position above the candy bars.

9. In a machine of the character described, means for feeding a plurality of candy bars, a nut hopper having an opening in the bottom for the passage of the nuts, a rotatable drum having a cylindrical outer surface below the hopper and above the path of travel of the candy bars, a plurality of arcuate plates mounted on the periphery of said drum and slidably supported thereon, said plates having openings therein for receiving nuts from the hopper, said drum and plates carried thereby being movable beneath the hopper opening, means engageable with the plates as they move beneath the hopper for reciprocating the plates to cause the nuts to enter the openings, and means extending around a portion of the drum periphery to hold the nuts in the openings until the nuts reach a position above the candy bars.

10. In a machine of the character described, means for feeding a plurality of candy bars, a nut hopper having an opening in the bottom for the passage of the nuts, a movable carrier below the hopper and above the path of travel of the candy bars, reciprocatable means mounted on said carrier having a plurality of pockets for receiving the nuts from the hopper, means for reciprocating said reciprocatable means as the carrier is rotated, said carrier and pocket carrying reciprocatable means being movable beneath the hopper opening, rotatable means in the hopper having flexible blades for positioning the nuts in the pockets and removing excess nuts from the path of travel of the drum and pockets, and means for holding the nuts in the pockets as the carrier is moved from receiving to discharging position above the candy bars.

11. In a machine of the character described, means for feeding a plurality of candy bars, a nut hopper having an opening in the bottom for the passage of the nuts, a rotatable drum below the hopper and above the path of travel of the candy bars, a plurality of arcuate plates mounted on the periphery of said drum and slidably supported thereon, said plates being movable beneath the hopper opening and having openings therein for receiving nuts from the hopper, means engageable with the plates as they move beneath the hopper for reciprocating the plates to cause the nuts to enter the openings, means to hold the nuts in the openings until the nuts reach a position above the candy bars, and means movable through the drum periphery and openings for ejecting the nuts from the openings and pushing the nuts into the candy bars and movable radially of the drum axis.

12. In a machine of the character described, means for feeding a plurality of candy bars, a nut hopper having an opening in the bottom for the passage of the nuts, a rotatable drum below the hopper and above the path of travel of the candy bars, a plurality of arcuate plates mounted on the periphery of said drum and slidably supported thereon, said plates being movable beneath the hopper opening and having openings therein for receiving nuts from the hopper, means engageable with the plates as they move beneath the hopper for reciprocating the plates to cause the nuts to enter the openings, rotatable means in the hopper having flexible blades for positioning the nuts in the pockets and preventing excess nuts from traveling with the drum and plates, means to hold the nuts in the openings until the nuts reach a position above the candy bars, and means movable through the drum periphery and openings for ejecting the nuts from the openings and pushing the nuts into the candy bars and movable radially of the drum axis.

LOUIS H. ZEUN.

REFERENCES CITED

The following references are of record in the file of this patent:

UNITED STATES PATENTS

| Number | Name | Date |
|---|---|---|
| 832,553 | Marsh | Oct. 2, 1906 |
| 1,786,108 | Drury | Dec. 23, 1930 |
| 1,938,423 | Greer | Dec. 5, 1933 |
| 2,002,018 | Martoccio | May 21, 1935 |